United States Patent [19]

Noguchi et al.

[11] 4,152,614

[45] May 1, 1979

[54] MINIATURE ELECTRIC MOTORS AND METHOD FOR MANUFACTURING ROTORS FOR THE SAME

[75] Inventors: Ichiro Noguchi; Hisashi Muroga, both of Tokyo, Japan

[73] Assignee: Gakken Co., Ltd., Tokyo, Japan

[21] Appl. No.: 717,234

[22] Filed: Aug. 24, 1976

[51] Int. Cl.² .......................................... H01R 13/04
[52] U.S. Cl. ............................ 310/233; 310/40 MM
[58] Field of Search ................... 310/40 MM, 89, 233, 310/234, 235, 236, 239, 240, 241, 242, 245, 1, 154, 219, 232, 42, 224, 225, 226, 228; 29/507

[56] References Cited

U.S. PATENT DOCUMENTS

| 1,525,957 | 2/1925 | Vogel | 310/233 |
|---|---|---|---|
| 1,693,327 | 11/1928 | Abrahms | 310/235 |
| 2,598,211 | 5/1952 | Beliaeff | 310/154 M X |
| 2,639,396 | 5/1953 | Harry | 310/235 |
| 2,944,169 | 7/1960 | Schmidt | 310/40 MM |
| 3,159,763 | 12/1964 | Colvill | 310/245 |
| 3,234,417 | 2/1966 | Somers | 310/40 MM |
| 3,447,011 | 5/1969 | Amrein | 310/236 |
| 3,525,891 | 8/1970 | Lukawich | 310/239 |
| 3,551,716 | 12/1970 | Jensen | 310/234 |
| 3,982,146 | 9/1976 | Hokky | 310/89 |

*Primary Examiner*—R. Skudy
*Attorney, Agent, or Firm*—Irving M. Weiner; Pamela S. Austin; Melvin Yedlin

[57] ABSTRACT

An improved small electric motor for use as a power source for toys, small electric instruments, and portable electric instruments, and a method for manufacturing rotors for such motor. The small electric motor is provided on a rotary shaft with a commutator provided in parallel and feeder brushes in resilient contact with the commutator. The commutator is fitted to the rotary shaft in a manner providing simplicity of assembly, adjustable positioning of the commutator on the rotary shaft, standardization of a magnet case, and favorable performance in the small motor.

3 Claims, 16 Drawing Figures

MINIATURE ELECTRIC MOTORS AND METHOD FOR MANUFACTURING ROTORS FOR THE SAME

The present invention relates to improvements in small electric motors to be used as power sources for toys, small electric instruments and portable electric instruments, and to a method of manufacturing rotors for the same.

More particularly, the present invention relates to a small electric motor of a type provided on a rotary shaft with a commutator provided in parallel with it and feeder brushes in resilient contact with the commutator. The commutator is fitted to the rotary shaft by being pressed in so that the assembly of the commutator may be simplified, and the positioning of the commutator in the axial direction on the rotary shaft may be adjustable. The magnet case may be easily standardized, a method favorable to mass-production of small motors may be included, and the contact of the brushes with the commutator is not defective. Therefore, the performance is favorable.

Prior Art and Background of the Invention

Small electric motors are used as power sources for various power toys, small electric instruments and portable electric instruments. Generally adopted small electric motors are of a tripolar structure type comprising a case, a magnet, a rotary shaft provided through the case and provided with a core consisting of an iron core and coils. A commutator is provided on the rotary shaft and feeder brushes are provided on the case lid plate, fed with electricity from an outside battery and contacting the commutator. The commutators in such small motors are divided largely into two kinds, a flat type perpendicular to the rotary shaft and a cylindrical type parallel with the rotary shaft. Adopted feeder brushes are varied depending on the respective types.

The cylindrical commutator is positioned and secured on the rotary shaft through an insulator. Such commutator has been so far fitted as follows.

As the first means, the commutator fitting part on the periphery of the rotary shaft fitted with an iron core is knurled and is fitted with the commutator fitting parts so that, by the knurls, the commutator parts may be prevented from rotating, may be positioned, and may be prevented from being pulled out in the axial direction.

As the second means, the insulating plates provided in the front and rear of the iron core are provided with such engaging parts as engaging recesses, projections and holes, and the commutator fitting parts are provided with an engaging part engaging with them so that the commutator may be positioned and may be prevented from rotating.

In such conventional means, in the first means, as the rotary shaft is knurled, a material low in hardness will have to be used, the fine rotary shaft of a small motor will be reduced in strength, will be bent or deformed when it is knurled or is fitted with the parts and therefore will often be defective and the yield of products will be low. The knurling is troublesome in itself, raises the production cost of the motor, together with the above, and reduces the strength after fitting.

In the second means, the projections and recesses are troublesome to shape and, because the insulating plate is molded of fibers, the strength will be reduced in the engaging part and will become a problem. Particularly, in the commutator of this type, if the capacity is to be varied by varying the number of iron core plates and the axial thickness of the core, as the core part is regulated by the commutator, the axial center of the core will vary and, as a result, the center of the magnet and the center of the core in a predetermined relative position with it will not coincide with each other in a proper position. Therefore, the magnetic force will act in the direction of the thrust, the rotary shaft will be pushed in the axial direction, an excess load will be applied to the shaft and bearing parts, the output will be lost and the performance of the motor will deteriorate. In order to prevent this, it is necessary to vary the position of the magnet or to change the case. This is not desirable in mass-production and standardization of small motors.

Further, the brushes to contact this commutator and feed the coils with electricity are so formed as to be in resilient contact with the commutator by a spring.

There are various types of brushes. Because the brush of a type in which the brush is made integral with a spring so as to be in resilient contact with the commutator by the resiliency of the brush itself is assembled by being gripped in assembling the motor, the resiliency of the brush will be varied by such gripping operation and, as a result, two brushes assembled together with fluctuate or become nonuniform in resiliency and will therefore be likely to be partially worn. In a type in which the brush and spring are made separate bodies, because the brush and a terminal leading electricity from outside are separate bodies, the action of resiliently pressing the brush into contact with the commutator and the action of resiliently pressing the brush and terminal into contact with each other to prevent defective contact of them are hardly compatible and either will likely be in defective contact.

Further, in the type in which a plate spring material itself is used as a brush as mentioned above, the contact part of the brush will be heated by contact with the rotating commutator. Therefore, the resiliency of the brush will deteriorate and a defective contact by the reduction of resiliency will be present.

Therefore, a brush of a carbon brush type is desirable. However, as the brush of this type generally has the carbon brush directly held by a spring material, the heat generated by contact of the carbon brush with the commutator will be propagated directly to the spring member and such problems as the deterioration of resiliency of the spring material and defective contact will be caused. Further, the carbon will be worn by contact with the commutator, thereby the contact pressure of the brush will be varied, the output of the motor will reduce as combined with the above-mentioned deterioration of resiliency by the propagation of the generated heat, fluctuation of the number of revolutions will occur and the performance of the motor will be reduced.

SUMMARY OF THE INVENTION

In view of such various problems in small motors as are mentioned above, the present invention is made to effectively solve them.

A primary object of the present invention is to effectively solve such various problems in a small electric motor of a cylindrical commutator type as are mentioned above.

In the present invention, three commutator pieces arcuate in cross-section are fitted onto a rotary shaft by being pressed in. There is provided a small electric motor wherein the parts for fitting the commutator pieces are pressed in and fixed on the rotary shaft together with the commutator pieces and the commutator is fitted to the rotary shaft by pressing in the respective component parts onto the shaft without the necessity of knurling the rotary shaft and providing the insulating plates provided in front and rear of the core with engaging parts so that the assembly and structure of the commutator may be simplified, a small motor including a commutator may be simply assembled and mass-produced, the rotary shaft is not reduced in strength and is not bent or broken in fitting the commutator. Therefore, the strength, life and durability of the motor is high.

Further, in the present invention, as the commutator is fitted onto the rotary shaft by being pressed in, the commutator can be fitted in any position on the rotary shaft. It is therefore effective in varying the output of the motor by varying the thickness of the iron core to vary the capacity of the core.

In case the position of the magnet with the case is determined in a fixed position in advance and is standardized, when the thickness of the iron core is varied to vary the capacity of the core, the clearance set between the center of the magnet and the center of the core in a predetermined relative position with it will vary. As a result, a force in the direction of the thrust will act on the core to load the shaft bearing. However, in the present invention, because the commutator is fitted to the rotary shaft by being pressed in, the position of fitting the commutator in the axial direction can be freely selected. Therefore, the capacity of the core can be varied and its center can be adjusted with respect to the center of the magnet.

Therefore, an object of the present invention is to provide a small electric motor which is varied in order to be high or low in output and can be manufactured as standardized without varying the positions of the case and magnet. In this manner, many kinds of motors may be mass-produced by using the cases, magnets and commutators in common.

Further, the invention provides a method of manufacturing rotors for small electric motors including pressing in an fitting the above-mentioned commutators and a manufacturing method simplifying the assembly of commutators and contributing greatly to mass-production of small motors.

A second object of the present invention is to solve the above-mentioned problems of the brush contacting the above-mentioned commutator to feed electricity.

The present invention has an object to provide a small electric motor including brushes, each formed of a carbon brush, its holder, a means of resiliently pressing the brush consisting of the carbon brush and holder, a means of resiliently pressing the brush and terminal using said resilient pressing means in common and said terminal as separate bodies so that, when the respective parts are assembled, the contact of the brush with the commutator and terminal is favorable and positive without fail. Further, the brush is kept uniform in contact pressure following the wear of the carbon, the resiliently pressing means is protected from heating of the brush and the brush may be high in performance, life and durability.

DETAILED DESCRIPTION OF THE PREFERRED EMBODIMENTS

The preferred embodiments of the present invention will be explained now in detail with reference to the accompanying drawings in the following so that the present invention may be well understood.

Figure 1:
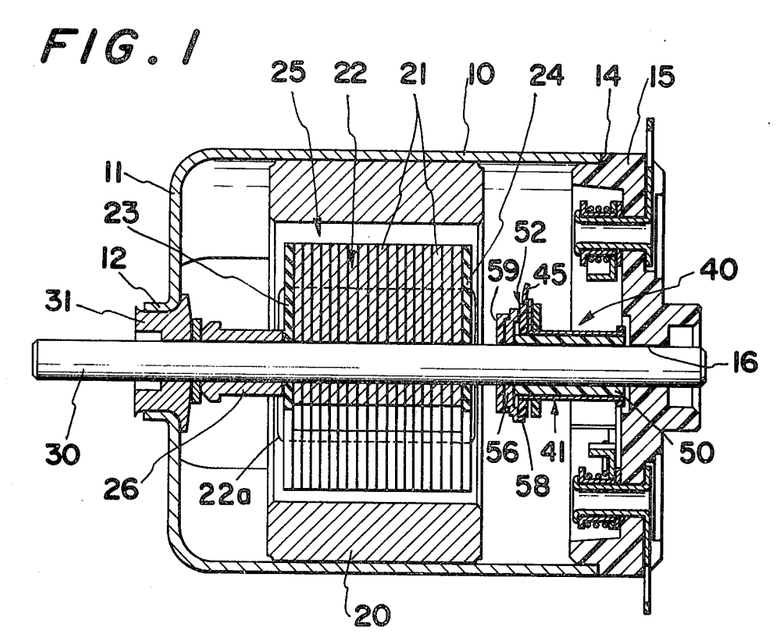
FIG. 1 is a side view of an electric motor according to the present invention.

FIG. 1 shows a sectioned side view of an electric motor according to the present invention and includes already known parts.

Reference numeral 10 designates a motor case obtained by cylindrically forming a metal plate material. The motor case 10 is closed on one end surface with an end plate 11 provided at its center with a bearing part 12 which projects outwardly in the axial direction and to which a bearing 31 made of an oil-less metal is secured by means such as riveting as pressed in the axial direction.

A substantially smooth and unknurled rotary shaft 30 passing through the case 10 is rotatably fitted on the output side in the bearing 31 and projects outwardly at the output end.

The rotary shaft 30 passes through the case 10, is borne in a bearing hole 16 made in the center of a lid body 15 molded of a plastic, fitted to the open end edge 14 of the case 10 and combined integrally with the case 10.

A magnet 20 is provided on the inner periphery of the middle part of the case 10. As clearly depicted in FIG. 2, an iron core 22 formed by pressing in a plurality of Y-shaped iron plates 21 on the rotary shaft 30 and laminating them in the axial direction is provided on the rotary shaft 30 within the inner periphery of the magnet 20. Insulating plates 23 and 24 formed of fiber materials of the same shapes are provided overlapped respectively in the front and rear of the iron core 22. A spacer 26 (FIG. 1) is fitted on the rotary shaft 30 between the bearing 31 provided in the end plate 11 of the case 10 and the front insulating plate 23, may be made of a metal or plastic, and is set to be of a proper length.

Coils 22a are wound outside the above-mentioned iron core 22 so as to form a core 25.

A commutator 40 is set between the rear insulating plate 24 of the core 25 on the rotary shaft 30 and the lid body 15.

The structure of the commutator 40 and the method of assembling or manufacturing it shall be explained with reference to FIGS. 2 through 7.

Figure 2:
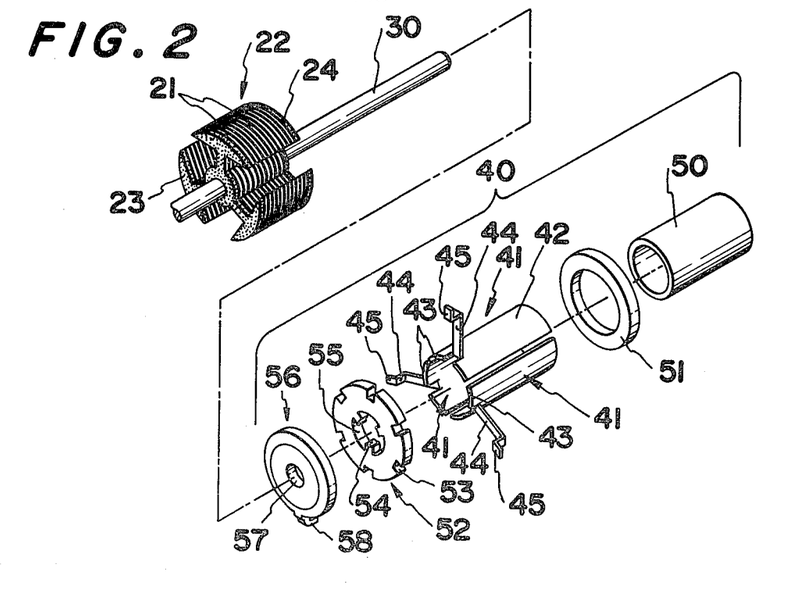
FIG. 2 is a perspective view of a disassembled commutator.

FIG. 2 shows a perspective view of component parts of the commutator 40 as disassembled and arranged in the axial direction.

The respective component parts of the commutator 40 according to the present invention will now be explained. In FIG. 2, the insulating pipe 50 is a base for fitting the commutator, is molded of a plastic and has the inside diameter so set as to be strongly fitted and pressed onto the rotary shaft 30. A pressing ring 51 fits and presses on its outer periphery three commutator pieces 41 applied to the outer periphery of the pipe 50 and it is also formed of an insulating plastic or fibers.

The commutator pieces 41 consist of three pieces comprising arcuate bodies set at fixed angles of the same radius in the sections. This arc is so set as to be able to keep a fixed clearance between both end edges of the respective arcuate pieces 42 in case the arcuate pieces 42 of the respective commutator pieces 41 are radially overlapped on the outer periphery of the pipe 50.

The arcuate piece 42 of the commutator piece 41 is formed to be of a fixed length in the axial direction. A rising piece 44 rising perpendicularly outwardly from a position somewhat retreated rearward in the axial direction is formed in the middle of the front surface 43 of the arcuate part 42 and is bent at the outer end to be L-shaped to form a coil engaging part 45. The three commutator pieces 41 are formed to be of the same shape.

A commutator pressing stand 52 is also formed of an insulating plastic or fibers to be ring-shaped, is provided radially on the outer periphery with recesses 53 in which the base parts of the engaging parts 45 of the commutator pieces are to be respectively fitted and is further provided on the inner periphery 54 with recesses 55 in which the front ends 43 of the commutator pieces 41 are to be respectively fitted. The inner periphery 54 between the recesses 55 is so set as to closely fit the outer periphery of the pipe 50.

A positioning ring 56 is formed of a metal material, having the hole 57 of it set so as to be able to be fitted to the rotary shaft 30 only by being strongly fitted and pressed and having a positioning projection 58 engaging with one of the recesses 53 on the outer periphery of the pressing stand 52 formed in a part of the outer periphery.

The structure of the commutator 40 as fitted on the rotary shaft 30 is clearly depicted in FIGS. 1 through 9.

The commutator 40 is provided on the rotary shaft 30 between the rear surface of the core 25 and the inner surface of the lid body 15. The pipe 50 is first fitted on the periphery of the rotary shaft 30, the inside surfaces of the arcuate parts 42 of the three commutator pieces 41 are overlapped on the outer periphery of the pipe 50, and the commutator pressing stand 52 is loosely fitted on the rotary shaft 30 on the front surfaces of the commutator pieces 41 so as to be related with the commutator pieces 41. The front end part of the outer periphery of the pipe 50 is strongly fitted with the inner periphery part 54 of the pressing stand 52 and the front ends 43 of the commutator pieces 41 are inserted and supported between the three recesses 55 in the inner peripheral part 54 and the outer periphery of the pipe 50. Further, the rear surface of the pressing stand 52 contacts the front surface of each rising piece 44 and each engaging part 45 engages with the recess 53 on the outer periphery of the pressing stand 52 so as to project for a proper length at the front end out of the outer periphery of the pressing stand 52 and to be connected to the coil end (not illustrated).

The positioning ring 56 strongly fitted and pressed to the rotary shaft 30 is provided on the front surface of the pressing stand 52 and is in contact on the rear surface with the front end of the pipe 50 to position the commutator 40 in the axial direction. The outside diameter of the ring 56 is so set as to be smaller than the outside diameter of the pressing stand 52 so that the coil may not contact it when the coil is wound and engages with the engaging part 45 of the commutator piece 41. The projection 58 of the ring 56 engages with one of the recesses 53 made on the outer periphery of the pressing stand 52 so as to position the commutator in the peripheral direction on the shaft.

Further, an insulating plate member 59 (FIGS. 1 and 9) molded of an insulating plastic is provided on the front surface of the positioning ring 56 to cover it so that the ring 56 may be prevented from contacting the end part of the wound coil projecting in the axial direction and the electricity may be prevented from being leaked by contact of the ring 56 with the coil. Also, a narrow ring 60 (FIG. 9) made of an insulator is fitted to the outer peripheries of the rear end parts of the commutator pieces 41 so as to hold the commutator pieces 41 in the end parts.

The method of assembling or manufacturing the thus fitted commutator shall be explained in the following.

FIGS. 3 through 7 of the drawings show the assembling method of the present invention in the sequential order of steps.

Figure 3:
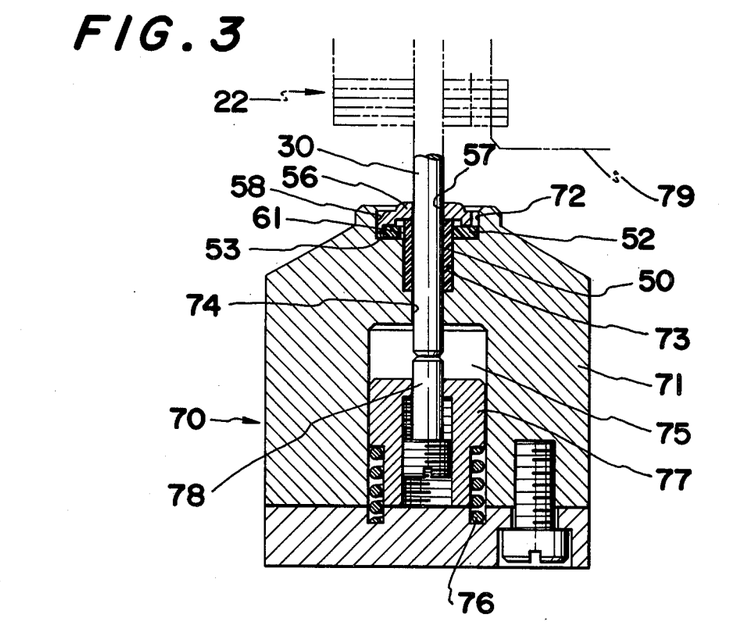
FIG. 3 is a sectioned side view showing the first step of assembling the commutator.

As shown in the sectioned side view of FIG. 3, the jig 70 to be used in the first step is provided in the top part of the jig body 71 with recessed step parts 72 and 73 of large and small diameters made to open upward. A hole 74 through which the rotary shaft 30 is to be inserted is made in the center of these step parts 72 and 73 and communicates in the lower part with a chamber 75 within the jig body 71. A holder 77 resiliently supported with a cushioning spring 76 is elevatably fitted within the chamber 75 and is provided in the center with a positioning shaft 78 which is combined with the holder through a screw thread so as to be able to adjust the height in the axial direction of the inserting hole 74.

The pipe 50 is fitted and inserted in the recessed step part 73 of small diameter, the ring-shaped pressing stand 52 is fitted and inserted in the recessed step part 72 of large diameter, and the pipe 50 is projected at the tip out of the hole in the pressing stand 52 so that the pipe 50 may be held on the outer periphery by the projections 54 on the inner periphery of the hole and a clearance 61 may be formed by the recess 55 between the outer periphery of the pipe 50 and the inner periphery of the hole. The positioning ring 56 is mounted on the pressing stand 52 so that its hole 57 and the hole of said pressing stand 52 may be concentric with the pipe 50. The projection 58 of the ring 56 is engaged with one of the recesses 53 of the pressing stand 52 so as to be integral. Then, the rotary shaft 30 fitted with the iron core 22 pressed-in in advance is lowered while held with a ram of a press or the like so as to be lowered and inserted into the inserting hole 74. Thereby, the shaft 30 will be forcibly fitted, inserted and pressed into the positioning ring 56 and pipe 50 set in the jig 70 in advance, the lowering stroke of the shaft 30 will be regulated by the positioning shaft 78 and, when the positioning shaft 78 contacts at the tip with the tip of the shaft 30, the lowering motion will stop. The shock of the rotary shaft in lowering will be cushioned by the die cushioning action of the spring 76.

By the above, the pipe 50, pressing stand 52 and positioning ring 56 will be pressed and fixed in fixed positions on the rotary shaft 30 and the positions of the above members on the rotary shaft 30 will be determined by the vertical adjustment of the positioning shaft 78. Therefore, in case the thickness of the iron core 22 is varied, the above-mentiond members will be able to be adjusted and fixed in the positions on the shaft in which the center of the iron core 22 and that of the magnet 20 fit with each other.

Figure 4:
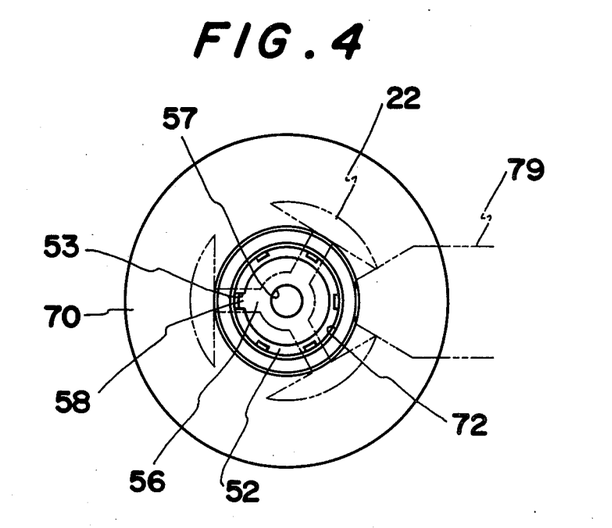
FIG. 4 is a plan view of FIG. 3.

In the above, the angles in the peripheral direction on the rotary shaft 30 of the commutator fitting part and iron core are made to coincide with each other by inserting a rule 79 between two of the three arms of the iron core as shown in FIG. 4.

Figures 5, 6:
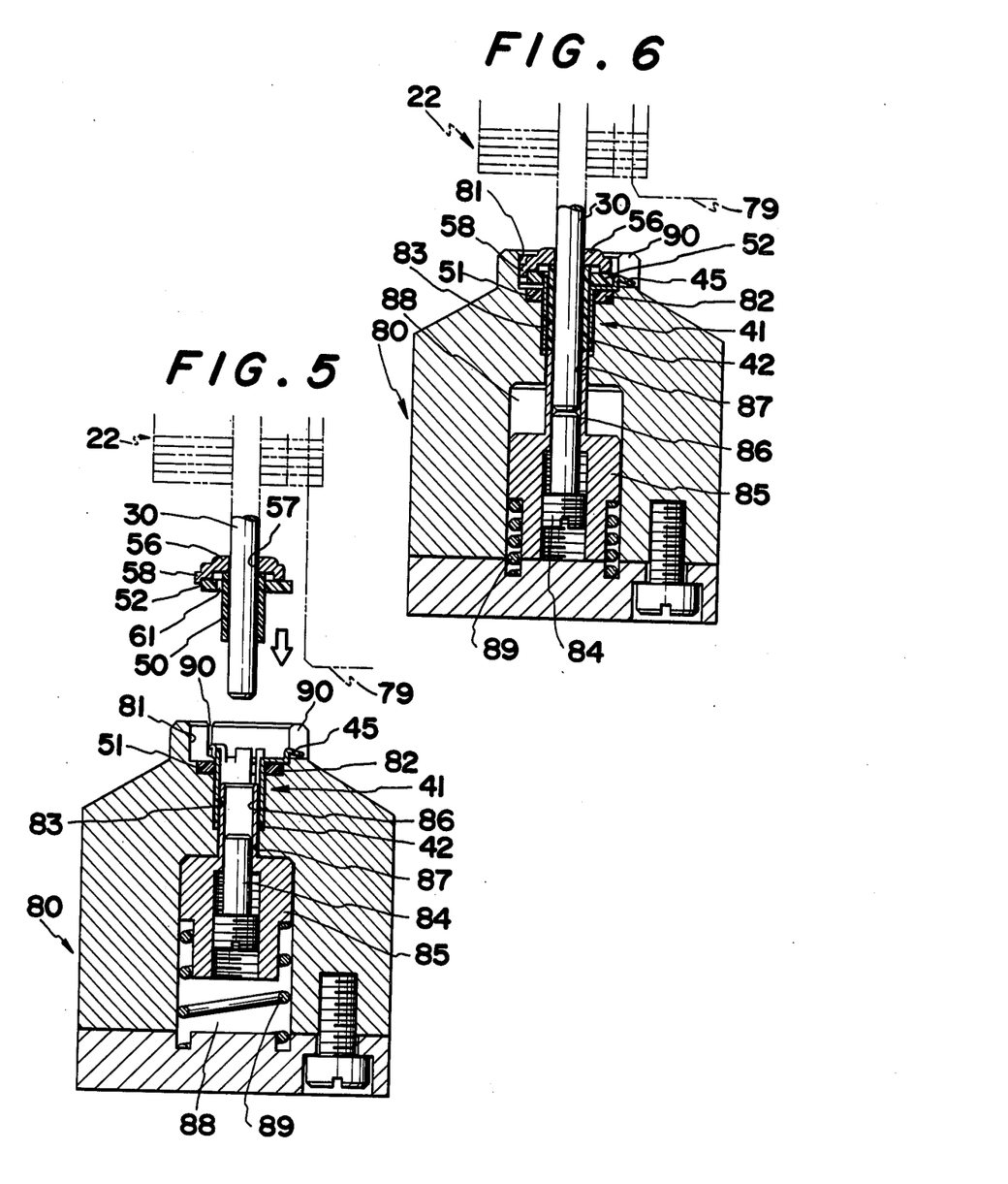
FIG. 5 is a sectioned side view showing the second step of assembling the commutator.
FIG. 6 is the same view as in FIG. 5 at the end of the assembly.
Figure 7:
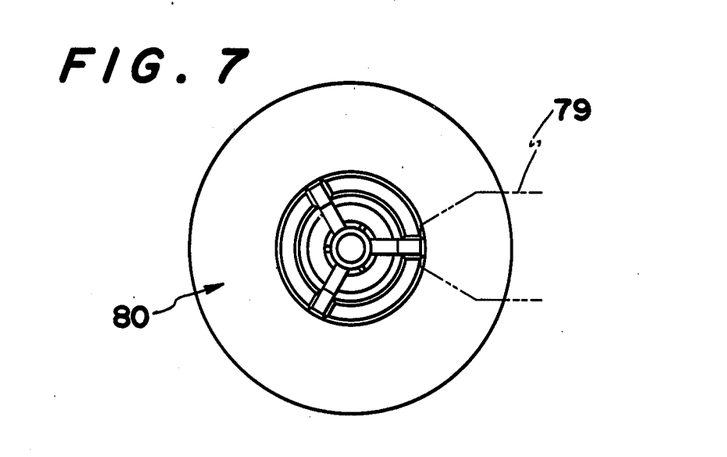
FIG. 7 is a plan view of FIG. 6.

After the parts are thus fitted to the rotary shaft 30, when the shaft 30 is made to rise, the rotary shaft as fitted with the parts from the jig 70, that is, such partly completed product as depicted in FIG. 5, will be obtained. Then it is moved to such second step as is shown in FIGS. 5 through 7.

As clear in the drawings, the jig 80 to be used in the second step is provided with three large, medium, and small recessed step parts 81, 82 and 83, respectively, from above, and a positioning shaft 84 provided on the outer periphery with a holder 85. The shaft 84 is combined with the holder 85 through a screw thread so as to be vertically adjustable. The shaft 84 fits in the sleeve 86 extended above the holder 85. The sleeve 86 fits in an inserting hole 87 continued with the recessed step part 83 so as to be in the center of said recessed step part 83. Further, the holder 85 is resiliently supported by a cushioning spring 89 loosely fitted in a chamber 88 provided in the lower part of the jig 80.

The parts to be set in the second step are the pressing ring 51 and three commutator pieces 41. First, the pressing ring 51 is fitted and inserted in the recessed step part 82 of medium diameter and the arcuate parts 42 of the commutator pieces 41 are inserted in the recessed part 83 of the small diameter through the hole of said pressing ring 51. A fixed clearance is set between both opposed ends of the arcuate parts 42. As the engaging parts 45 of the commutator pieces 41 project in the radial directions, three cuts 90 are made on the periphery at the upper end of the jig 80.

The rotary shaft 30 having had the above-mentioned parts pressed in and fixed is lowered in the same manner as is mentioned above and is inserted into the jig 80 so as to be fitted and inserted at the tip in the sleeve 86 and to stop in contact with the positioning shaft 84.

In this process, the pipe 50 will fit in a circular space enclosed with the arcuate parts 42 of the commutator pieces 41 and will be positioned at the end in contact with the sleeve 86. The engaging parts 45 at the tips of the commutator pieces 41 will engage with the respective recesses 53 of the pressing stand 52. The commutator pieces 41 and pressing ring 51 will be pressed in and fixed to the parts fixed in the first step. In this case, too, the angles of the iron core 22 and commutator will be accurately set with a rule 79. The commutator pieces 41 will be pressed at the tips 43 into a clearance 61 and will be pressed in the arcuate parts 42 against the pipe 50 with the front and rear members 52 and 51.

After the second step ends, when the rotary shaft 30 is raised, a rotor having the iron core 22 and commutator 40 fixed to the rotary shaft 30 will be obtained. Then the rotor has the coils wound and connected with the commutator pieces and is set in a motor case.

In the above, in case the insulating plate 59 is to be provided on the front surface of the positioning ring 56, it may be fitted by being set on the ring 56 in the first step and the ring 60 may be fitted when the second step ends.

As can be understood in the above, the commutator 40 as pressed in is fitted to the rotary shaft 30.

Therefore, the assembly of the commutator is simple, the assembly and manufacture of the rotor including the core can be mechanized and automated and are very favorable to the automation of the manufacture and mass-production of the motors. Further, as the commutator is pressed in, such work as knurling the rotary shaft is not required and the simplification of manufacture is promoted. Further, the rotor requires no work reducing the strength of the rotary shaft. Therefore, a material high in hardness can be selected and the rotary shaft will not bend at the time of assembling the motor.

The most remarkable effect of the present invention is that, as the commutator is pressed in and fixed, the position of fitting it on the rotary shaft can be selected.

Such effect can best be understood with reference to FIGS. 11A–11C and 12A to 12C.

Figure 11:
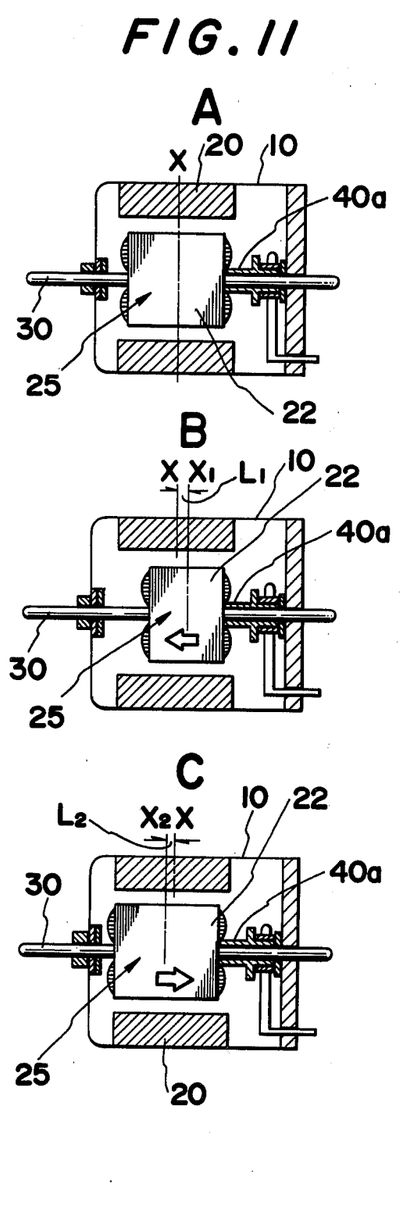
FIGS. 11A–11C are views explaining the influence of variation of the capacity of a core.

FIG. 11 shows an electric motor with a conventional commutator 40a. As in FIG. 11A, the axial center lines X of the magnet 20 fitted in the motor case 10 and of the core 25 on the rotary shaft 30 coincide with each other and therefore the rotary shaft 30 will be subjected only to the torque. Here, the commutator 40a is positioned in the axial direction by the contact of the core holding member with the end surface of the core. However, in case the capacity of the core 25 is made smaller, that is, the thickness of the iron core 22 is reduced so as to obtain a motor of a smaller output, as in FIG. 11B, the center $X_1$ of the iron core 22 in a predetermined relative position with the magnet 20 will move forward from the center X of the magnet 20 and a distance $L_1$ will be produced between the respective centers. As a result, a force in the direction shown by the arrows in FIG. 11B will be applied to the rotary shaft. Also, in case the thickness of the iron core 22 is made larger, as in FIG. 11C, a distance $L_2$ will be produced between the respective centers X and $X_2$. As a result, a force in such direction as is indicated by the arrows in FIG. 11C will act so that an excess load will be applied to the rotary shaft and the output of the motor will be lost.

In order to solve the above, it is necessary to change the position of the magnet. This is very unreasonable in the case of standardizing the cases and magnets of all small motors and arranging many kinds of motors of different outputs.

Figure 12:
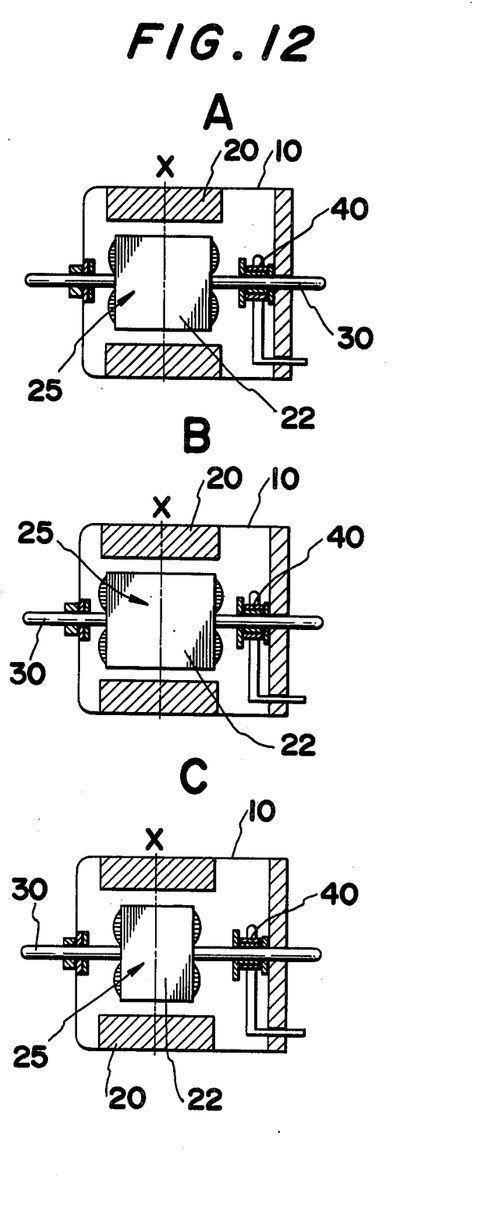
FIGS. 12A–12C are views explaining the variation of the capacity of the core of the small motor according to the present invention.

According to the present invention, as shown in FIGS. 12A–12C, in the case that FIG. 12A is made a base, the centers X of the magnet 20 and core 25 in a predetermined relative position with it coincide with each other and the commutator 40 is also fitted in a fixed position on the rotary shaft 30 in response to it.

Here, in case the thickness of the iron core 22 is made larger as shown in FIG. 12B, the centers of the magnet 20 and iron core 22 will no longer coincide with each other in the state of FIG. 12A. But, as the commutator 40 is pressed in, the fitting position on the rotary shaft 30 will be able to be easily adjusted and changed. Therefore, in such case, if the fitting position on the rotary shaft 30 is adjusted in the stage of pressing in the commutator 40, the centers of the magnet 20 and core 25 in a predetermined relative position with it will be able to be made to coincide with each other. FIG. 12C illustrates the case of the iron core 22 of the core 25 being made thin. In this case, too, as in the above, the core and magnet will be able to be set in fixed positions by adjusting the position of the commutator 40 on the rotary shaft 30.

Therefore, even in the case of obtaining motors of different outputs by changing the capacity of the core 25, various types of motors can be obtained while standardizing the cases and magnets without the need of changing the position of the magnet. The output required of the motor is different between a powered toy and small electric instrument. In such case, according to the present invention, various motors of different outputs can be easily obtained by standardizing the case and changing the capacity of the core.

The feeder brushes to be used in the present invention shall be referred to in the following.

Figure 8:
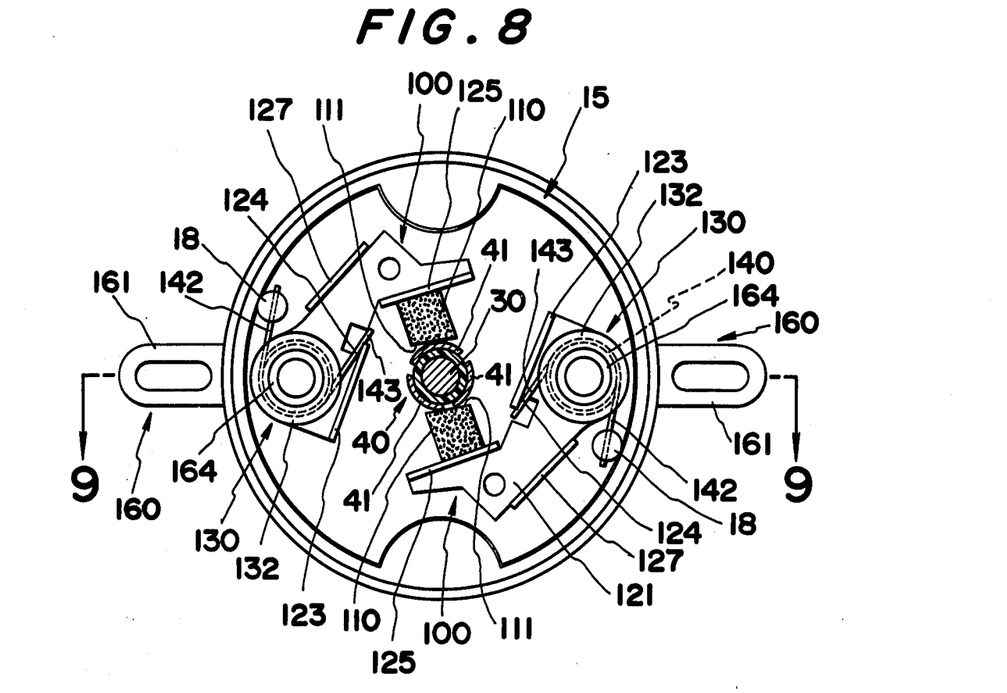
FIG. 8 is an inside view of a motor lid plate.
Figures 9, 10:
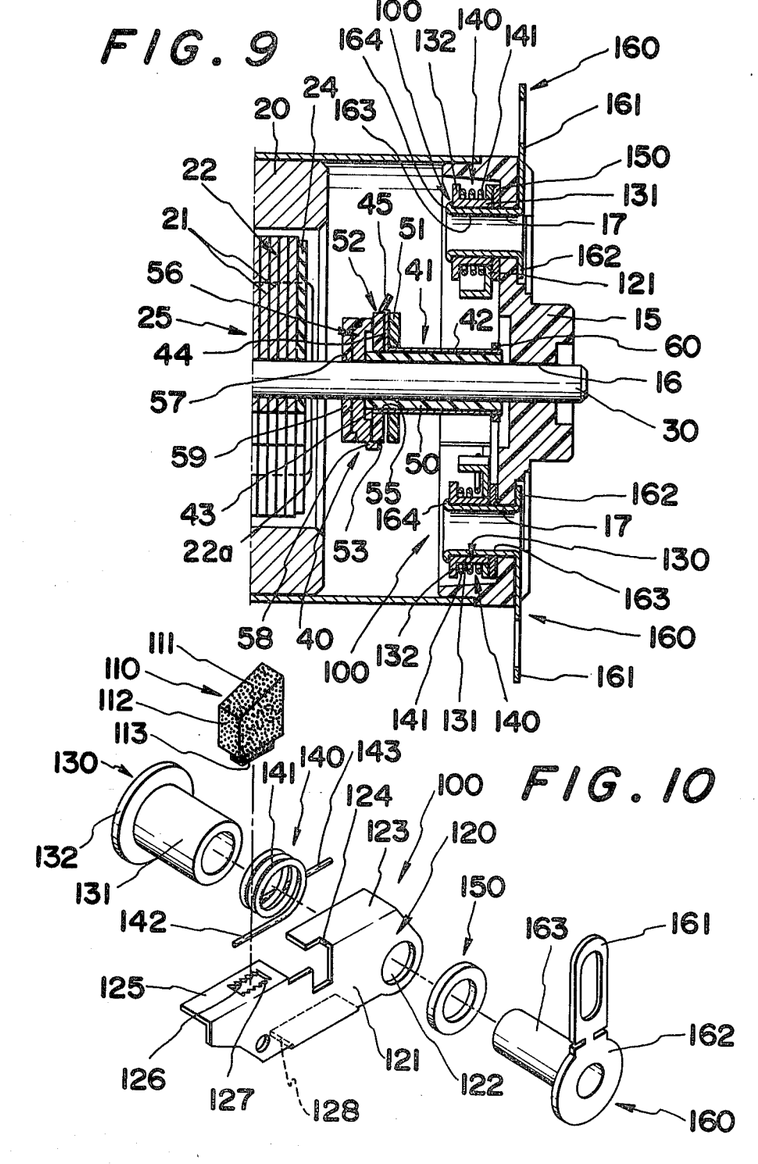
FIG. 9 is a sectioned view taken along line 9—9 of FIG. 8.
FIG. 10 is a perspective view of a disassembled brush part.

The feeder brushes 100 are shown in FIGS. 1 and 8–10. FIG. 10 shows a perspective view of disassembled component parts so that the structure of the brush 100 may be easily understood.

As shown in FIG. 10, the brush 100 comprises a carbon brush 110, holding arm 120 therefor, bush 130, coil spring 140 and ring 150 and is further provided with a terminal 160.

The holding arm 120 is shaped of a conductive metal plate material, has a fitting hole 122 formed in the base part of a flat body 121, is provided at the upper end of said base part with an engaging piece 123 bent 90° in the same direction at the upper end of the tip part of the body 121. A rectangular fitting hole 126 having teeth 127 formed on the long sides thereof is made on the surface of said fitting piece 125. A piece 128 bent 90° in the same direction is provided at the lower end of the central part of the body 121. The carbon brush 110 is provided with a contact surface 111 to contact with the commutator 40. As clearly depicted in FIG. 8, said contact surface 111 is formed to be tapered and has the end section shaped to be rectangular. The body 112 of the carbon brush 110 is provided in the lower side part with a fitting part 113 tapered downward on the four peripheral sides and fitting in the fitting hole 126 in the arm 120 so as to be pushed from above with said part 113 fitted in the hole 126. Thereby, the fitting part 113 will be strongly fitted and pressed into the hole 126 and may be fixed by applying a conductive binder as required and the teeth 127 on the long sides of the hole 126 will bite into the side surfaces of the fitting part 113 so that the carbon brush 110 is firmly and positively fitted to the arm 120.

The terminal 160 comprises a terminal plate 161 positioned outside the lid body 15 and connected with a lead wire of a current source, a flange part 162 in contact with the outer end surface of one of the fitting holes 17 made in positions separated by 180° on the surface of the lid body 15, and an integral cylindrical eyelet-shaped rivet part 163 extended in the direction at 90° with the inner end surface of the flange part 162 as all integrally shaped of a conductive metal plate material. The rivet part 163 is so set as to be inserted through the fitting hole 17 to project at the tip for a proper length into the lid body 15 and is inserted into the fitting hole 17 in the lid body 15 so that the terminal plate 161 including the flange part 162 may be exposed on the outer surface of the lid body 15.

A conductive ring 150 is first fitted and inserted on the outer periphery of the rivet part projected on the inner surface of the lid body 15 so as to be parallel with the rotary shaft 30. Then the arm 120 fitted with the carbon brush 110 is fitted to the rivet part 163 through its hole 122 so that the engaging piece 123 and fitting piece 126 may be directed toward the commutator 40. Then, as shown in FIG. 10, the coil part 141 of a coil spring 140 having at both ends straight locking parts 142 and 143 made to be directed in opposing directions to each other is loosely fitted into the outer periphery of the rivet part 163. Thereafter, as shown in FIG. 10, a bush 130 made of a conductive metal material, provided with a cylindrical part 131 fitting the outer periphery of the rivet part 163 and having a flange part 132 in the end part of said cylindrical part 131 is fitted in the cylindrical part 131 on the outer periphery of the rivet part 163. The cylindrical part 131 is fitted on the inner periphery of the coil part 141 of the spring 140.

While the parts are thus assembled on the rivet part 163 projected on the inner surface of the lid body 15, one locking part 142 of the coil spring 140 is hung and locted on a locking projection 18 (FIG. 8) provided to project in one of two places on the inner surface of the lid plate 15 and the other locking part 143 is hung and locked on a locking cut part 124 made in the engaging piece 123 of the arm 120 so that the coil spring 140 may be compressed in the peripheral direction by both locking parts 142 and 143.

Further, together with the above, the rivet part 163 is compressed in the axial direction with a riveting machine so as to be pressed and collapsed at the tip and to be enlarged in diameter in the axial direction. The flange part 132 of the bush 130 is supported on the end surface with the pressed and collapsed flange part 164 so that the spring 140 may be compressed in the axial direction.

The brush as fitted is shown in FIGS. 8 and 9. Brushes 100 are provided in two places separated from each other by 180°. Thereby, the arm 120 as shown in FIG. 8 will be subjected to a resiliency to rotate clockwise by the coil spring 140 and to a spring force resiliently contacting the contact surface 111 of the carbon brush 110 at the tip with the commutator 40. Further, as shown in FIG. 9, by the expanding resiliency in the axial direction of the spring 140, the flange part 132 of the bush 130 will be pushed against the pressed and collapsed flange part 164 at the tip of the rivet part 163 of the terminal 160 and also the body 121 of the arm 120 will be pushed against the end surface of the ring 150 so as to electrically positively contact the terminal 160. Therefore, by the spring 140, the bush 130 and arm 120 will positively contact the terminal and the electricity will be favorably received from the outside current sorce. The arm 120 will bring the carbon brush 110 into positive and resilient contact with the commutator 40 by the action of the spring 140 and the electricity will be favorably supplied to the commutator.

Even if the carbon brush 110 is worn by the sliding contact with the commutator 40, it will be followed by the action of the spring so that such defect as contact failure by the wear may be prevented.

Besides the action of the spring by thus forming the brush, even if the carbon brush is heated by contact with the commutator, because the arm 120 and bush 130 are interposed between the carbon brush 110 and spring 140, the heat will be only slightly conducted, the resiliency of the spring 140 will not be deteriorated by lengthy operation of the motor and failure of the contact of the brush with the commutator will be prevented from occurring. Therefore, a small electric motor high and stable in performance, long in life, and high in durability can be obtained.

We claim:

1. A small electric motor comprising:
   a case having a closed wall end;
   a magnet fitted within said case;
   a rotary shaft passing through said closed wall end of said case, a lid body, and a core including a laminated iron core positioned in the inner peripheral part of said magnet;
   insulating plates provided in the front and rear of said iron core, said iron core having coils wound thereon;
   a commutator pressed in and fixed, by means of fitting members, between said core and said lid body on a substantially smooth and unknurled portion of said rotary shaft and having contact surfaces parallel with said rotary shaft;
   said fitting members fixing said commutator on said smooth rotary shaft portion only by press-fitting of said fitting members on said shaft portion;
   said commutator being fixed in a selected one of axially-varying positions on said smooth rotary shaft portion, to permit variable positioning of said core relative to the center of said magnet; and
   brushes provided in said lid body and resiliently pressed toward said rotary shaft and commutator;
   wherein said commutator comprises:
   (a) a positioning ring made of a metal which positions in said selected one of said axially-varying positions said commutator on said rotary shaft and pressed in on said rotary shaft;
   (b) an insulating pipe pressed in on said rotary shaft;
   (c) commutator pieces provided with bodies including three divided conductive metal pieces each having a part rising in the radial direction at the tip, arcuate in cross-section, having a length in the axial direction, and having said bodies overlapped on said pipe; and
   (d) front and rear ring-shaped insulating members holding said rising parts of said commutator pieces in front and rear and pressing said pieces from the outer periphery of said pipe having said bodies overlapped thereon.

2. A small electric motor according to claim 2, wherein:
   said commutator is provided with an insulating plate for preventing the coils wound on said core from contacting said ring, said plate being positioned at the extreme end of said commutator and in front of said positioning ring, facing said core.

3. A small electric motor comprising:
   a case having a closed wall end;
   a magnet fitted within said case;
   a rotary shaft passing through said closed wall end of said case, a lid body, and a core including a laminated iron core positioned in the inner peripheral part of said magnet;
   insulating plates provided in the front and rear of said iron core, said iron core having coils wound thereon;
   a commutator pressed in and fixed through fitting members between said core and said lid body on said rotary shaft and having contact surfaces parallel with said rotary shaft;
   brushes provided in said lid body and resiliently pressed toward said rotary shaft and commutator;
   said commutator including:
   (a) positioning ring made of a metal which positions in the axial direction said commutator on said rotary shaft and pressed in on said rotary shaft;
   (b) an insulating pipe pressed in on said rotary shaft;
   (c) commutator pieces provided with bodies including three divided conductive metal pieces each having a part rising in the radial direction at the tip, arcuate in cross-section, having a length in the axial direction, and having said bodies overlapped on said pipe; and
   (d) front and rear ring-shaped insulating members holding said rising parts of said commutator pieces in front and rear and pressing said pieces from the outer periphery of said pipe having said bodies overlapped thereon;
   said positioning ring being provided with a projection for determining the angular positions on said rotary shaft of said core and said commutator;
   said front ring-shaped member for pressing said commutator pieces in contact with the rear surface of said ring being provided on the outer periphery with recesses engaging with said projection, a plurality of recesses for positioning said commutator pieces, and on the inner periphery with recesses engaging with the tip parts of said arcuate bodies of said commutator pieces; and
   said commutator pieces being provided in the rear of the tips of said arcuate bodies with pieces rising in the radial directions of said rotary shaft and at the tips of said rising pieces with respective engaging parts engaging with recesses on the outer periphery of said front pressing member and having coils adapted to be connected with said extensions of said tips.

* * * * *